UNITED STATES PATENT OFFICE.

ADOLF ISRAEL AND RICHARD KOTHE, OF ELBERFELD, GERMANY, ASSIGNORS TO THE FARBENFABRIKEN OF ELBERFELD COMPANY, OF NEW YORK.

ORANGE AZO DYE AND PROCESS OF MAKING SAME.

SPECIFICATION forming part of Letters Patent No. 663,498, dated December 11, 1900.

Application filed May 23, 1900. Serial No. 17,724. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in new Azo Dyes; and we hereby declare the following to be a clear and exact description of our invention.

In the two applications for Letters Patent bearing the Serial Nos. 11,239 and 11,240, both filed on April 2, 1900, we have described the production of new urea and thio-urea compounds having the formula:

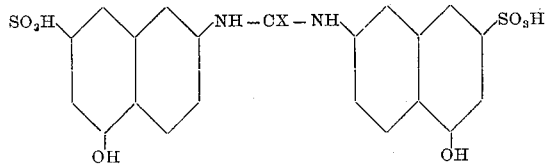

in which formula X means an atom of oxygen which may be replaced by an atom of sulfur.

Our present invention relates to the production of valuable new azo coloring-matters by causing two molecules of a suitable diazo compound to act on the said urea or thio-urea compound.

We point out specifically that by the term "diazo compound" in the following specification we intend to denote a simple diazo compound as well as a diazotized amidoazo compound, such as diazoazobenzene, diazoazotoluene, or the like.

The new dyestuffs are alkaline salts of acids having most probably the following general formula:

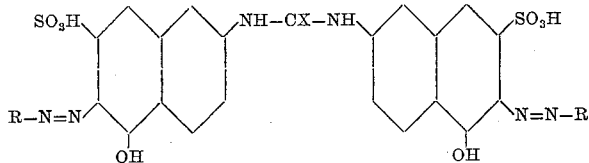

(in which formula X means an atom of oxygen which may be replaced by an atom of sulfur, R an alphyl radical, such as phenyl, acetylamidophenyl, tolyl, xylyl, phenylazophenyl, tolylazophenyl, or the like,) and which are from reddish-brown to dark-brown powders having a metallic luster, dissolving in water with from orange to red to bluish-red color. They dye unmordanted cotton from orange to bluish-red shades which are of a remarkable fastness to light.

In carrying out our new process practically we can proceed as follows, the parts being by weight: 13.3 parts of anilin are diazotized in the usual manner with the aid of fifty-six parts of hydrochloric acid (of 15° Baumé) and ten parts of sodium nitrite. The resulting diazo solution is then slowly stirred into a solution prepared from 39.2 parts of the sodium salt of carbonyldioxydinaphthylamin-disulfonic acid, (prepared from beta$_1$-amido-alpha$_3$-naphthol-beta$_4$-monosulfonic acid,) and thirty parts of sodium carbonate, (Na$_2$CO$_3$.) After having stirred for several hours the formation of the dyestuff has been finished. The latter is separated from the mixture by the addition of common salt and isolated by filtration. The new coloring-matter thus obtained is the sodium salt of an acid having most probably the formula:

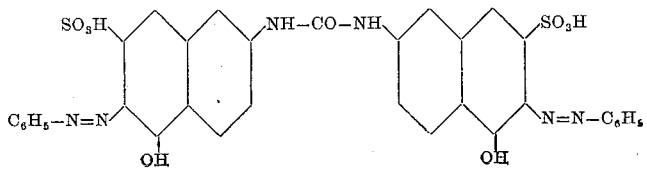

and is a reddish-brown powder having a metallic luster, soluble in water with an orange color. It is insoluble in concentrated hydrochloric acid, while it is dissolved by concentrated sulfuric acid (of 66° Baumé) with a red color which is changed into bluish-red on the addition of a small quantity of ice, while on the addition of a larger quantity of ice a reddish-blue precipitate is obtained.

The new coloring-matter dyes unmordanted cotton orange-yellow shades, which are fast to acids and to light.

The process proceeds in an analogous manner if instead of two molecules of diazotized anilin other diazotized compounds are employed. On using, for instance, two molecules of diazotized acetyl-para-phenylenediamin or two molecules of diazotized amidoazobenzene bluish-red dyestuffs are obtained. On using two molecules of diazotized para-xylidin a yellowish-red dyestuff is produced.

Having now described our invention and in what manner the same is to be performed, what we claim as new, and desire to secure by Letters Patent, is—

1. The process for producing new azo dyestuffs which process consists in first combining two molecules of a diazo compound with one molecule of an urea derivative having the formula:

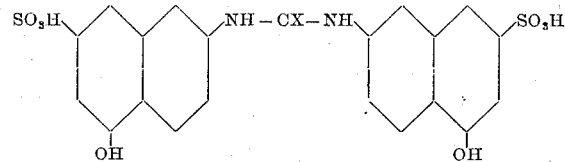

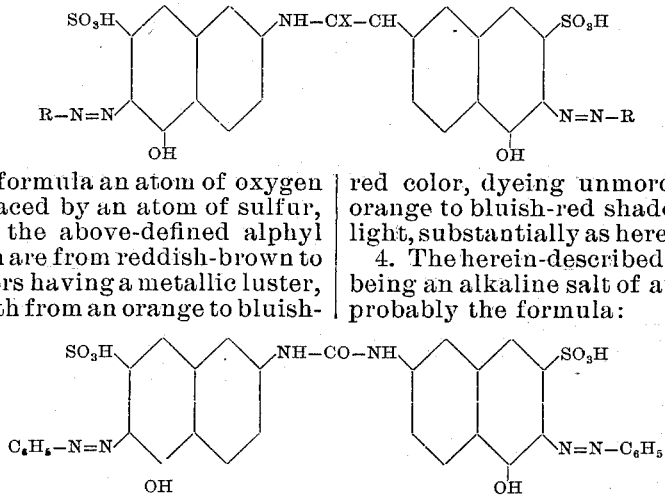

X meaning in this formula an atom of oxygen which may be replaced by an atom of sulfur, R meaning one of the above-defined alphyl radicals, and which are from reddish-brown to dark-brown powders having a metallic luster, soluble in water with from an orange to bluish-red color, dyeing unmordanted cotton from orange to bluish-red shades which are fast to light, substantially as hereinbefore described.

in which formula X means an atom of oxygen which may be replaced by an atom of sulfur, secondly precipitating the resulting dyestuff by means of a suitable salt and finally isolating the same from the reaction mixture, substantially as hereinbefore described.

2. The process for producing a new disazo dyestuff which process consists in first combining two molecules of diazotized anilin with one molecule of carbonyldioxydinaphthylamin disulfonic acid having in a free state the formula:

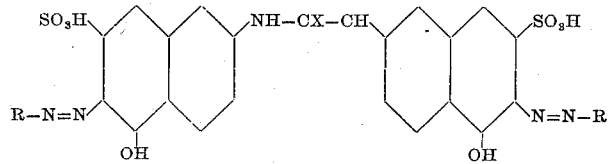

secondly precipitating the resulting dyestuff with the aid of a suitable salt, and finally isolating the same from the reaction mixture, substantially as hereinbefore described.

3. The herein-described new azo dyestuffs which are alkaline salts of acids having most probably the general formula:

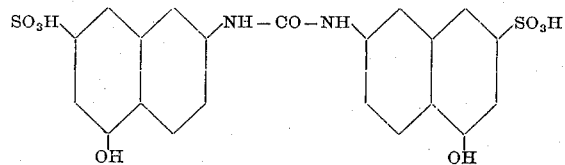

which in the form of its sodium salt is a reddish-brown powder having a metallic luster, soluble in water with an orange color; insoluble in concentrated hydrochloric acid; being dissolved by concentrated sulfuric acid of 66° Baumé with a red color which is changed into bluish-red on the addition of a small quantity of ice while on the addition of a larger quantity of ice a reddish-blue precipitate is obtained, dyeing unmordanted cotton orange-yellow shades which are fast to acids and to light, substantially as hereinbefore described.

4. The herein-described new disazo dyestuff being an alkaline salt of an acid, having most probably the formula:

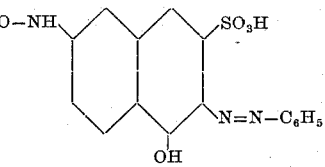

yellow shades which are fast to acids and to light, substantially as hereinbefore described.

In testimony whereof we have signed our names in the presence of two subscribing witnesses.

ADOLF ISRAEL.
RICHARD KOTHE.

Witnesses:
OTTO KÖNIG,
J. A. RITTERSHAUS.